June 22, 1943.   A. D. BLANCHARD   2,322,562
CONNECTOR
Filed Oct. 9, 1941
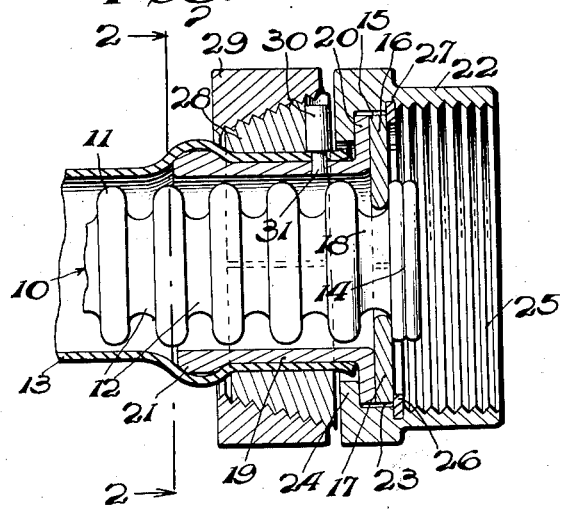
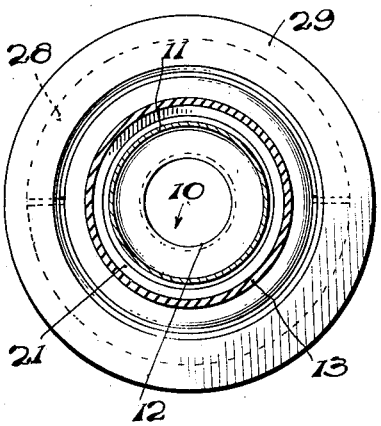
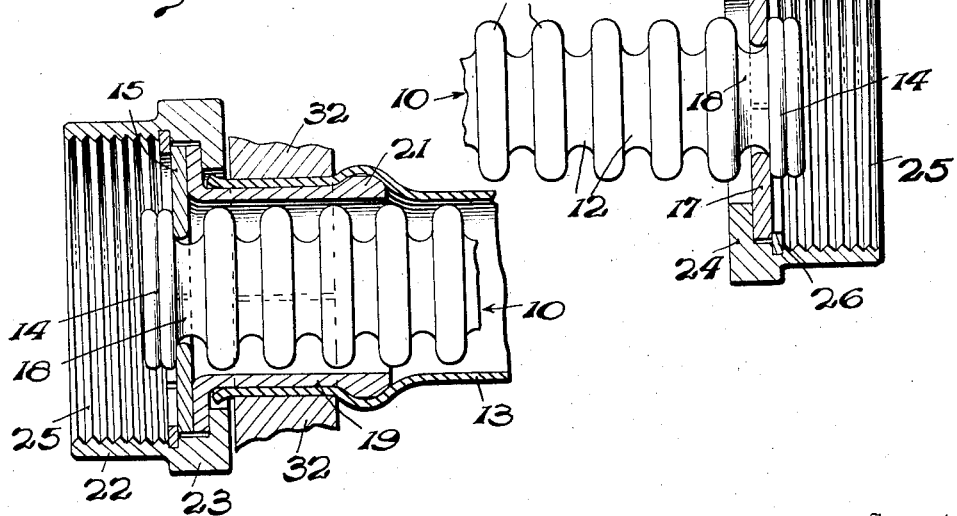
Inventor
Arthur D. Blanchard.
By David F. Doody
Attorney Patented June 22, 1943

2,322,562

UNITED STATES PATENT OFFICE 2,322,562

CONNECTOR

Arthur D. Blanchard, Bloomfield, N. J., assignor to Bendix Aviation Corporation, South Bend, Ind., a corporation of Delaware Application October 9, 1941, Serial No. 414,356

2 Claims. (Cl. 285—72)

This invention relates to couplings, and more particularly to connecting means for tubing.

It is an object of the present invention to provide a connector or terminal for tubing, which is readily replaceable and renewable.

It is a further object of the invention to provide a coupling member for conduit, without the use of solder, welding or heat.

An additional object of the invention lies in the provision of a terminal member for tubing, which may be readily assembled without the use of special tools.

Other objects will appear from a study of the following specification when made in conjunction with the attached drawing, throughout which like numerals designate like parts.

Fig. 1 is a longitudinal, sectional view of one embodiment of the present invention.

Fig. 2 is a cross-sectional view taken along the line 2—2 of Fig. 1.

Fig. 3 is a longitudinal, sectional view of another embodiment of the present invention.

Fig. 4 is a similar view of another embodiment of the present invention.

Having reference particularly to Fig. 1, 10 represents a flexible, metallic conduit, having spaced parallel corrugations 11, separated by intervening valleys 12. Conduit 10 is contained within a sheathing or armour 13 of braided, metallic strands or the like. Conduit 10 terminates in a radially extending flange portion 14, formed by pressing one or more adjacent corrugations 11 together. An annular washer 15, formed in two split halves 16 and 17, surrounds conduit 10 in the right end valley 18, embracing valley 18 in a loose, but secure fit.

A cylindrical skirt member 19 carries an integral, outwardly projecting annular flange 20 at one end, lying against split washer 15, and is provided, at its other end, with a bead member 21, as shown in Fig. 1.

Washer 15 and flange portion 20 of skirt 19 fit with a sliding frictional fit within a nut 22, having a smooth bore or internal skirt portion 23, an inwardly projecting flange or shoulder portion 24, and internal thread members 25 for connection with any suitable threaded union (not shown). A retaining ring 26, of spring metal, is held in a groove 27 formed in nut 22, closely adjacent split washer 15.

A split screw collar 28 is carried upon skirt 19 about sheathing 13 and has conically extending threads, which engage with a conically and internally threaded nut member 29. A depression is formed within collar 28 to accommodate a pilot pin member 30, which is mounted within aperture 31 in skirt member 19, so that an operator may tighten the nut 29 upon split collar 28 without causing the latter to turn with the nut 29.

The connector or terminal just described may be assembled by first slipping the conically threaded nut member 29, as well as the cylindrical nut 22, over the end of conduit 10 and armour 13. Conduit 10 and sheathing 13 are threaded into nut portion 22, and skirt 19 is advanced upon conduit 10 and the end of sheathing 13 is drawn over bead 21 and completely over the skirt member 19. The split washer 15 is assembled within the valley 18, and the nut 22 is next drawn forward over conduit 10 to the position shown in Fig. 1, and spring retainer 26 is snapped into groove 27 to maintain split washer 15, flange 20 and nut 22 in assembled relation. Pilot pin 30 is inserted into the aperture 31 within skirt member 19, which is provided for receiving the shank of pin 30 with a secure, but detachable, fit. Split screw collar 28 is placed in the position shown, whereupon the conically threaded nut 29 is advanced upon the threads of the split collar, until the split collar is drawn tightly upon armour 13. Then, the whole assembly may be threaded into a screw-threaded union or terminal of any suitable type.

The connector above described is readily renewable, and may be re-used in the event that a new conduit 10 is substituted for the original at any time.

Fig. 3 shows a terminal or connector which is somewhat similar, except that the interfitting split collar 28 and conically threaded nut 29, as well as the pilot pin 30, are replaced by a cylindrical deformable band 32, which, upon application to braid 13, is permanently crimped into connection therewith by any suitable means, such as a pliers or a special vise member. The connector is used in exactly the same manner, but differs from that shown in Fig. 1 only in that it is not renewable without destruction of the crimped band 32.

A form of connector embodying the teaching of the present invention, for use when the conduit lacks an armour or sheathing, is shown in Fig. 4. Split washer 15, formed in two halves (as in Figs. 1 and 3), embraces valley 18 in a loose, but firm fit, in the manner above described. Washer 15 is retained in assembled condition and is confined within nut 23 by means of the spring retaining member 26, which may be snapped into the annular groove 27, formed within nut 22. No other fastening member is needed to retain the connector assembled and ready at any time for connection to a conventional terminal.

Three embodiments of the present invention are shown in the drawing, and each represents a means whereby a novel type of terminal or connector may be provided, obviating the use of welding or any application of heat, giving a gas-tight or liquid-tight connection with a conventional terminal or connector member. It is to be understood, however, that the invention is not restricted to the forms shown, but is limited only by the scope of the appended claims.

What is claimed is:

1. A connector comprising a section of conduit having a circumferentially grooved portion, a split washer positioned upon said circumferentially grooved portion, a threaded nut embracing said washer, an inwardly projecting annular flange formed on said nut and a retaining member carried in said nut and confining said split washer therein.

2. A connector comprising a section of conduit having a circumferentially grooved portion, a split washer positioned upon said circumferentially grooved portion, a threaded nut embracing said washer, a cylindrical skirt member having an outwardly projecting annular flange within said nut, an inwardly projecting annular flange carried by said nut, a tubular sheathing member surrounding said conduit, the end of said sheathing member being carried by said skirt member, and means for retaining said sheathing upon said skirt.

ARTHUR D. BLANCHARD.